April 1, 1941.  W. W. CARTER  2,237,048

MOLDED ARTICLE AND METHOD OF MAKING IT

Filed May 23, 1938

Inventor
William W. Carter
by Wright, Brown, Quinby & May
Attys.

Patented Apr. 1, 1941

2,237,048

UNITED STATES PATENT OFFICE 2,237,048

MOLDED ARTICLE AND METHOD OF MAKING IT

William W. Carter, Needham, Mass., assignor to Brayton Morton, trustee, Boston, Mass.

Application May 23, 1938, Serial No. 209,407

2 Claims. (Cl. 229—3.5)

The object of the present invention is to produce molded articles such as plates and other dishes, trays, cups, etc.,—in fact any articles having a raised rim or of hollow formation, and a multitude of other articles as well, capable of being molded,—out of fibers and plastic substances, including resins. Hollow articles of various kinds have heretofore been molded from synthetic resins, particularly the phenolic resins, which are unaffected by water, and by heat below the temperature of destructive distillation; but such articles are brittle. Also panels and sheets of various thicknesses have been made of layers of paper impregnated with such resins, united by heat and pressure. Sheets of this character, and articles cut from them are tough and resistant to fracture by virtue of their content of fiber, and they are more or less resistant to water and heat due to their content of resin; but they can be made only in the flat or with cylindrical curvature. They cannot be molded with a hollow formation bounded on all sides by a raised portion, without cutting out pieces. Molding requires flow of the material under pressure of the molds, and when the material contains fibers, the flow caused by molding displaces or breaks and more or less separates the fibers in those parts of the material where flow occurs, with the result that the finished article is weak and brittle in those parts where any appreciable flow has occurred. In the case of structures made of paper sheets impregnated with resin, distortion either breaks the sheets if of a character to stretch them and if carried beyond a very small amount, or causes the sheets to pucker and make folds blocking the movement of pressing dies. While this objection is not so pronounced in the case of products made of layers of cloth impregnated with resin, the difference in the latter case is one of degree only, and the depth to which material of impregnated laminated cloth construction can be molded is limited. The high cost of this material is an objection to its commercial use and prohibits its use for many purposes.

The present invention has overcome the objections above noted and made possible the production of molded hollow articles, unlimited as to depth, of low cost, which are of homogeneous structure and uniform strength throughout, are impervious to water when the incorporated plastic is insoluble in water and, when containing heat hardening resin, are unaffected also by heat below the temperature of carbonization. These accomplishments are obtained by providing a mixture of fibers, a dispersion of resin or other plastic suitable for the purpose, and water in the consistency of paper pulp, or a more or less similar consistency, forming the pulp into an approximation of the desired finished article while the pulp is fluid and the fibers are free to assume any arrangement constrained by the forming agencies, removing the water content of the formed or molded mixture, and finally compressing and giving the finished dimensions and contours to the article, and curing the content of resin in the material, by application of pressure and heat.

The invention comprises (a) the method of making hollow articles by preforming pulp and resin dispersions into an approximation of the finished article; (b) making such preforms and converting them into finished articles by pressure with heat sufficient to fuse the resin (and also cure it when a heat hardening resin is used); (c) preforms of hollow articles having a generated form; and (d) the final product resulting from molding such preforms with application of suitable heat and pressure. The articles embraced within the invention are characterized by sides and bottom or top walls or flanges of substantially uniform structure and composition throughout. For want of a better term, I have defined them as of angular generated form, meaning that their bounding surfaces are such as would be generated by a line which is other than straight revolving about an axis, or traveling along a line otherwise than straight, which extends transversely to the generating line. Applying this definition to the article herein illustrated, the generating line would be that consisting of the segments to which the reference characters b, c, d and e are applied in Fig. 4, together with half the bottom of the plate there shown, revolving around the geometrical axis of the plate. But the invention is not limited to articles bounded by surfaces of revolution only, but includes those of polygonal and other forms, regular or irregular, and complete or incomplete polygons. The generating line may be a continuously curved line of uniform or varying radii of curvature, or it may be made of two or more straight or curved portions joined on more or less sharp angles or curves. The sections of such an article on planes transverse to the travel of the generating line exhibit portions angularly disposed to one another.

The drawing furnished herewith shows illustratively one of the many articles which may be made by this process, in two stages of its manufacture.

Figure 1:
Figs. 1 and 2 are respectively a perspective view and a diametral section of a plate formed from a mixture of paper pulp and resin, after having been freed of water.
Figure 2:
Figure 3:
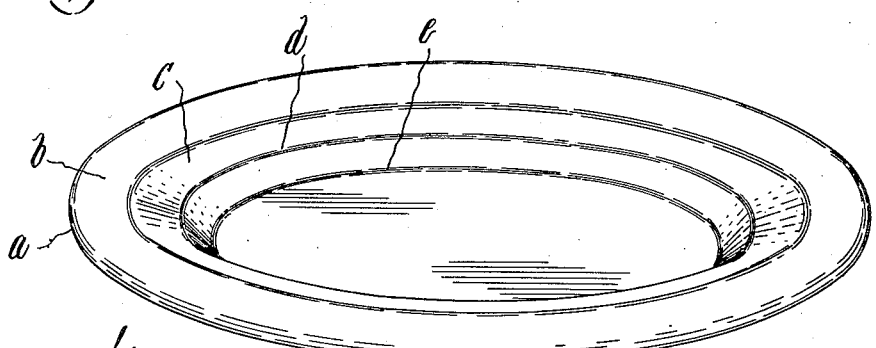
Figs. 3 and 4 are similar views of the finished plate.

In carrying out this invention, a pulp is made of fibers and water. Any fibers suitable for paper making may be used for this purpose, including fibers of such short length as are obtained from ground wood. I may use new pulp, such as sulphite wood pulp or a mixture of sulphite and ground wood fibers, or waste paper. Indeed old newspapers well beaten with water make a satisfactory and very inexpensive pulp.

With the pulp of fibers is mixed a suitable content of resin. Any resin may be used without departing from the principle and scope of the invention, but I prefer to use a synthetic resin of the heat hardening type, such as a formaldehyde-phenolic resin, rather than a resin of the thermo-plastic type. However, for articles which are not liable to be subjected to temperatures high enough to soften them, resins of a thermoplastic nature may be used.

The resin is mixed with the pulp in the pulp beater, and in order to obtain and maintain uniform dispersion of the resin through the pulp, I prefer to follow the procedure of my Patent No. 2,027,090, dated January 7, 1936, entitled Means and method for dispersing matter in manufactured material. According to that procedure, resin in finely divided condition is first mixed intimately, together with a sparse dispersion of fibers, throughout a body of gel forming liquid, which holds the dispersed fibers and particles of resin in suspension and, after gelling and being broken up in the pulp beater, encases particles of the resin and binds such particles to single fibers and groups of fibers of the original dispersion so that, when mixed with the pulp of the main fiber furnish, the resin particles are prevented by the attached fibers from settling out of the dispersion or being carried away with the extracted water when the pulp is being deposited on a form or shaped in a mold. In brief, the method of said patent causes the resin to be introduced into the pulp in small particles, enables the particles to be uniformly mixed and dispersed among the fibers, and causes the dispersion to remain substantially the same during the process of forming the pulp into the approximate shape of the article to be made. Attention is directed to said patent for a full description of the process, which is by reference made a part of this specification. While I do not limit the broader aspects of the invention to this mode of dispersing resin, nevertheless as it enables results to be obtained which, to the best of my knowledge and belief cannot be obtained by any other possible mode of dispersing resin in pulp, I claim it here as a step in the combined process of my more specific claims.

The proportional content of resin may vary widely. I have produced highly satisfactory plates and other articles in which the resin amounts by weight to about 40% of the weight of dry fiber in the pulp. But it may range from a percentage somewhat below 20% to one somewhat above 60%, depending on the qualities of toughness, hardness, strength and resistance to wetting and to chemical attack required of the finished article.

The pulp dispersion so produced is then formed into an approximation of the required article, but with greater thickness, by deposition under suction on or in a form, or by pressing between molding dies, by forcing the pulp into an enclosed space of proper form, having suitable provisions for drainage, or otherwise. That is, the same procedure may be used for this purpose as has been used heretofore for making articles of wood pulp, or any other suitable and satisfactory procedure may be followed. The shapes and articles capable of being thus produced include all which may be molded or applied externally upon or internally within a form, or forced into a suitably drained enclosed chamber, and from which the shaped mass of pulp can be removed when enough of the contained water has been extracted and the fibers have become felted together strongly enough to permit handling. For producing articles of such dimensions and proportions as require reinforcement by stronger material, or of which the use requires attachment to supports, the pulp may be molded around inserts suitable for the purpose. Thereafter the residual water among the fibers is evaporated.

Finally the roughly preformed article is placed between molding dies having smooth surfaces and contours complemental to the required contours of the finished article, and is subjected to pressure and heat of degrees sufficient to compact the fibers into a dense structure, and cure the resin. The loose textured preformed article may be thus compressed to about one third, more or less, of its original thickness. As there are limits of thickness beyond which it is not feasible to go in forming the article from pulp, particularly in the case of those deposited by suction, on account of the difficulty of extracting water from excessively thick formations, it may be desirable in many cases to place two or more of the pulp formations together in the final mold to obtain a finished article of a prescribed thickness and density. Under the effect of heat and pressure, the resin is melted and caused to flow so that it fills the reduced interstices between the fibers and forms a film at the surfaces of the article. When two or more of the preformed articles are thus pressed together, the resin thus coming to their contiguous surfaces binds them together into what is in effect a single integral structure.

In some cases it is found desirable to apply a coating of powdered or liquid resin on the surfaces of the preformed article before final molding; this in order to submerge any fibers which may stand out from the surfaces and to form a smoother surface than would be obtained otherwise. Coloring matter may be applied at the same time to these surfaces, whereby the ornamental effect is enhanced.

Figure 4:

The preformed shape given to the pulp article is so nearly the same as that of the finishing dies, that no appreciable flow or shift of the fibers occurs in the latter and virtually the only change is reduction in thickness of the article. That is, the structure and lay of the fibers remains substantially unchanged, except for compacting from their original molded shape. But minor formations, such as the bead shown at $a$ in Fig. 4, and distinct zones such as those shown at $b$ and $c$, which did not exist in the pulp preformation, may be made, and the angles, as at $d$ and $e$, between different surfaces may be sharpened, without causing any disruptive flow or displacement of the fibers.

The final result is an article in which the fibers are substantially unchanged in relationship to one another as a result of final pressing, except in that they are more closely packed together, and in which the fibers are unbroken and as strong intrinsically as in the original furnish. The article is unbreakable by the shocks and accidents which are so great a cause of destruction of glass and chinaware. It may be dropped on a hard floor or knocked against the edges of a sink in being washed, without breaking or chipping. It may without injury be washed in ordinary hot water and sterilized in boiling water. When a heat hardening resin is used, it may be safely subjected to higher temperatures than that of boiling water up to the degree at which destructive distillation of the resin and fibers begins.

The drawing illustrates the invention embodied in a dessert plate for table service. But it will be understood that plates and dishes of all other dimensions and shapes, cups and saucers, vegetables dishes, platters, trays, and a great variety of other articles, all of which are included within the term "article of dish shape," may be made in the same way.

What I claim and desire to secure by Letters Patent is:

1. An individual resin-bearing molded fibrous pulp article of dish shape and of substantially uniform composition throughout, consisting of a preshaped body compacted and finished under heat and mechanical pressure and composed essentially of interfelted fibres and a cured synthetic resin, the structure and lay of the fibers of said body being substantially unchanged, except for such compacting from their original molded shape and furnishing substantial mechanical strength to the article, and the resin being substantially uniformly cured throughout the fibrous structure of the body and furnishing a hard smooth enamel-like film of cured resin of uniform finish and appearance at the surfaces of the article.

2. An individual resin-bearing molded fibrous pulp article of dish shape and of substantially uniform composition throughout, consisting of a pre-shaped body die-molded to approximately the shape of the finished article from an aqueous pulp mixture consisting essentially of fibres and powdered uncured synthetic resin and compacted and finished under heat and mechanical pressure, said body before compacting and finishing presenting a loosely felted fibrous structure with the uncured powdered resin substantially uniformly distributed within the interstices thereof and retained thereby, the structure and lay of the fibres of said body being substantially unchanged except for such compacting from their original molded shape and furnishing substantial mechanical strength to the article and the resin being uniformly cured and spread throughout the fibrous structure of the body to bond the fibres thereof and to furnish a hard enamel-like finish to the surfaces of the article.

WILLIAM W. CARTER.